United States Patent [19]

Jons et al.

[11] Patent Number: 5,065,354

[45] Date of Patent: Nov. 12, 1991

[54] QUEUED POSTED-WRITE DISK WRITE METHOD WITH IMPROVED ERROR HANDLING

[75] Inventors: Curtis R. Jons, Cypress; Robert S. Gready, Houston, both of Tex.

[73] Assignee: Compaq Computer Corporation, Houston, Tex.

[21] Appl. No.: 245,865

[22] Filed: Sep. 16, 1988

[51] Int. Cl.[5] .............................................. G06F 13/00
[52] U.S. Cl. ................................. 395/575; 364/941.5; 364/952.1; 364/Dig. 1
[58] Field of Search .................. 364/200 MS, 900 MS

[56] References Cited

U.S. PATENT DOCUMENTS

| | | | |
|---|---|---|---|
| 4,138,732 | 2/1979 | Suzuki et al. | 364/900 |
| 4,394,733 | 7/1983 | Swenson | 364/200 |
| 4,454,595 | 6/1984 | Cage | 364/900 |
| 4,476,526 | 10/1984 | Dodd | 364/200 |
| 4,523,206 | 6/1985 | Sassler | 364/200 |
| 4,523,275 | 6/1985 | Swenson et al. | 364/200 |
| 4,527,233 | 7/1985 | Ambrosius III. et al. | 364/200 |
| 4,546,430 | 10/1985 | Moore et al. | 364/200 |

OTHER PUBLICATIONS

"Flash" program, Software Masters.
"Vcache" program, Golden Bow Systems.
"Super PC-Kwik" program, Multisoft.
"Ligthning" program, Personal Computer Support Group.
"Speed Cache" program, FSS Ltd.

Primary Examiner—Thomas M. Heckler
Attorney, Agent, or Firm—Pravel, Gambrell, Hewitt, Kimball & Kriger

[57] ABSTRACT

A posted-write queuing program for writing information sectors to disk sectors includes error-handling routines to minimize the risk of data loss upon specified types of errors. Upon timeouts, queuing is suspended and all information sectors pending in the queue are written out to the corresponding disk sectors. Upon specified types of write errors, queuing is discontinued and repeated attempts are made to write out all information sectors to the corresponding disk sectors. For each unsuccessful attempt, the corresponding information sector is saved in the queue; the user is alerted, and subsequent read or write requests directed to the corresponding disk sector is serviced from the saved information sector in the queue.

4 Claims, 5 Drawing Sheets

QUEUED POSTED-WRITE DISK WRITE METHOD WITH IMPROVED ERROR HANDLING

BACKGROUND OF THE INVENTION

This invention relates to a method for queuing posted-write disk write operations, with improved error handling.

DISK CACHING

Posted writes to a disk are roughly analogous in some ways to cached reads from a disk. Disk caching, as is well known to those of ordinary skill, is a method of keeping a copy of the information last read from a relatively slow storage device (e.g., a fixed or "hard" disk) in much faster read-write random-access memory (RAM). This permits quicker processing of subsequent requests for that data.

Disk caching typically operates in conjunction with read-operation requests by application programs or other programs (referred to here as "tasks").

Generally speaking, when a task initiates a read operation, it reserves a certain portion of RAM, referred to as a "buffer," and requests that the information stored in one or more disk sectors be copied to the buffer.

Once this information is copied to RAM, the task can manipulate the information much more rapidly than on the disk. In part, this is because manipulation of the information on the disk requires activation of mechanical components of a disk drive, whereas manipulation in RAM is done entirely electronically.

When disk caching is used, each time a task requests that a certain disk sector be read (i.e., copied into RAM), not only is the requested sector read, but in addition certain adjacent sectors are also copied into a special RAM "cache buffer." This is done on the assumption that these disk sectors are likely to be read soon themselves.

Consequently, if one or more of those adjacent sectors is indeed the subject of a subsequent read request, the request can be filled from the RAM cache buffer. Since the relatively slow disk drives need not be activated, and the request is thus filled entirely electronically, this subsequent read request is completed much faster than the first one.

When disk caching is enabled, whenever a read request for specified disk sectors is initiated, the cache buffer is checked first to see if the desired disk sectors have already been read into the cache buffer. Only if the information is not in the cache buffer is an actual disk read operation initiated, whereupon the new information is itself copied to the cache buffer. "Old" information in the cache buffer is removed from the buffer; generally speaking, the information that is removed is the least recently used information.

INTERRUPTS

The operation of the present invention makes use of a special capability designed into many computer architectures, known as "interrupts" and "interrupt handlers."

Interrupts cause a central processing unit (CPU) of a computer to suspend execution of the current program instruction(s); to execute a specific "interrupt handler" routine or set of instructions; and then to resume execution of the suspended current program instruction(s) at the point where it left off.

Interrupts can be generated by software, i.e., by special instructions built into a program known as "software interrupts." When the CPU encounters a software interrupt in a program, among other things it executes the associated interrupt handler routine, then returns to execution of the program into which the software interrupt was built. A return from an interrupt-generated call to an interrupt handler routine is known as an interrupt return or "IRET."

Interrupts can also be generated by appropriately designed hardware: many CPUs (e.g., the Intel 8086 family, including the 8086, 8088, 80286, and 80386) are designed so that other hardware components in the computer system can cause an interrupt by transmitting special signals to the CPU.

DISK WRITE INTERRUPTS

Interrupts are commonly used to initiate disk write operations. A disk write operation typically entails copying of information to the disk from RAM that is in use by a task.

A disk-write interrupt might be generated by a task. For example, a spreadsheet program could initiate such a request in order to save the user's work.

(In this discussion, a computer program itself is sometimes referred to as performing one or another operation. In reality, it is a hardware component such as the CPU that actually performs the operation under control of the program. This is a common shorthand in the art.)

DISK WRITE INTERRUPT HANDLER IN ISA BIOS

A common disk-write interrupt in the "industry standard architecture" (ISA) causes execution of a specific interrupt handler (known as INT 13H) that is part of the BIOS (basic input/output services) program. The industry standard architecture is exemplified by, e.g., the IBM PC and the Compaq Deskpro 286.

The BIOS program typically is stored in a read-only memory (ROM) installed in the ISA computer, and so the BIOS program itself is sometimes referred to as simply "the ROM."

In processing the disk write request, the INT 13H interrupt handler does two things (among others). The explanation below uses a write operation to a fixed disk as an example.

First, INT 13H copies the specified data to be written to disk (referred to here as a "write buffer") to a buffer under the control of a disk controller associated with the specified disk drive (e.g., in RAM that is installed with the disk controller and not as part of "main" memory). It then directs the disk controller to copy the data to a specified sector(s) on the disk.

That having been done, INT 13H itself calls the INT 15H WAIT interrupt handler. By default, INT 15 WAIT simply returns to the calling function, i.e., to the INT 13H interrupt handler.

INT 13H then enters a wait loop: in each iteration of the loop, it checks to see if a flag has been set to indicate that a fixed disk hardware interrupt has occurred; if the flag has not been set, the loop continues. In other words, the CPU is now busy waiting for the fixed disk hardware-interrupt-occurred flag to be set—and has not resumed executing the task's instructions.

When the disk controller has completed the write operation, it generates a hardware interrupt that causes the CPU to set the fixed disk hardware-interrupt-occurred flag and execute the INT 15H POST interrupt handler. This routine typically performs an IRET back to the INT 13H wait loop.

Now that the fixed disk hardware-interrupt-occurred flag has been set, the INT 13H wait loop is ended, whereupon INT 13H clears the flag, finishes its processing, and performs an IRET to return control to the task.

In effect, the design of the INT 13H interrupt handler routine forces the CPU to sit idle until the disk controller (which, once activated, does not need the CPU to perform its data-writing functions) has completed its work.

It will be recognized by those of ordinary skill that the above description relates to a relatively simple case of writing to disk. As is well known to those of ordinary skill, some write operations require multiple hardware interrupts thereby causing multiple WAITs and POSTs.

QUEUED WRITE OPERATIONS

Write queuing, generally speaking, involves directing some or all disk write requests to a queue buffer instead of to the disk in question, and control is given back to the task. The actual physical writing to disk is performed later on whenever convenient, thus reducing the delay in resuming execution of the calling task.

SUMMARY OF THE INVENTION

A posted-write queuing program for writing information sectors to disk sectors includes error-handling routines to minimize the risk of data loss upon specified types of errors. Upon timeouts, queuing is suspended and all information sectors pending in the queue are written out to the corresponding disk sectors. Upon specified types of write errors, queuing is discontinued and repeated attempts are made to write out all information sectors to the corresponding disk sectors. For each unsuccessful attempt, the corresponding information sector is saved in the queue; the user is alerted, and subsequent read or write requests directed to the corresponding disk sector is serviced from the saved information sector in the queue.

DETAILED DESCRIPTION OF SPECIFIC EMBODIMENTS

POSTED-WRITE QUEUEING IN DISK CACHE UTILITY

The present invention is illustrated by the following description of a set of routines for posting and queuing write requests generated by tasks. The routines operate as a part of a disk-cache installable device driver under the MS-DOS operating system (versions 3.10 through 3.39). Appendix 1 (which can be found in the application file) is a copy of the assembler source code for the routines.

The posted-write queuing routines operate in conjunction with a disk cache utility that maintains a cache buffer and a cache directory. In the illustration described here, the posted-write queuing routines are written as a part of such a disk cache utility, which forms no part of the present invention (except to the extent claimed) and is not otherwise described.

It will be understood that the description is presented by way of illustration and not as a limitation on the subject matter claimed.

SUBSTITUTION OF INTERRUPT HANDLERS

Several interrupt handlers in the BIOS program have their behavior altered (sometimes referred to as "hooked," "trapped," or "grabbed") in the conventional manner. Generally speaking, this involves (a) saving the vectors that are stored in low memory and are associated with the respective interrupt handlers; these vectors ordinarily point to the respective addresses of the normal BIOS interrupt handler routines; and (b) overwriting these vectors with new vectors pointing to the addresses of substitute interrupt handler routines.

In particular, the respective handlers for INT 13H, for INT 15H WAIT and INT 15H POST, and for timeouts and write errors, are replaced. Appendix 2 (which can be found in the application file) sets forth a pseudocode description of the substitute routines, briefly explaining in general terms the matters set forth in detail in Appendix 1.

As is conventional, a substitute routine may call the original interrupt handler; this is done by simply calling the original handler, whose address was saved as part of the overwriting process described above. For example, Appendix 2 shows that this is done in the substitute routine for INT 13H.

MEMORY ALLOCATION FOR QUEUE

The posted-write queuing routines use an 8K FIFO (first-in, first-out) buffer in main memory for queuing write requests. More specifically, the queue utilizes the base memory that is reserved by the cache driver during its installation.

The queue is kept relatively small to reduce the chance of data loss due to the user turning off the computer when it appears that the write is complete (when in fact it is not).

SINGLE-SECTOR WRITES

If the write buffer of a disk write request will occupy no more than one sector on the disk (i.e., if the request is for a single-sector write), then broadly speaking, the write request is queued and posted as complete, and control is returned to the task.

Figure 1:
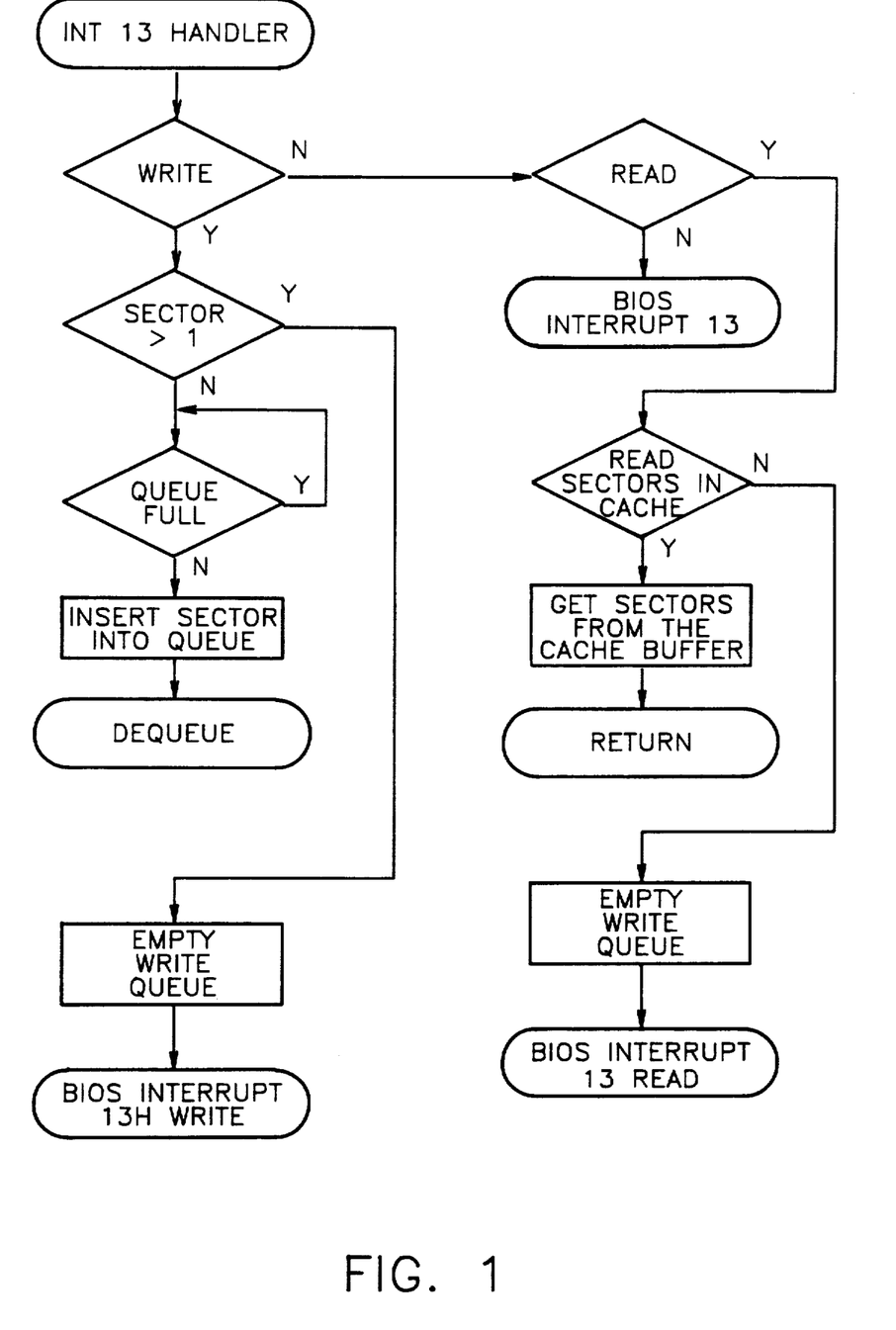
FIGS. 1-7 are flowchart illustrations of operating sequences of a computer system incorporating the present invention.
Figure 4:
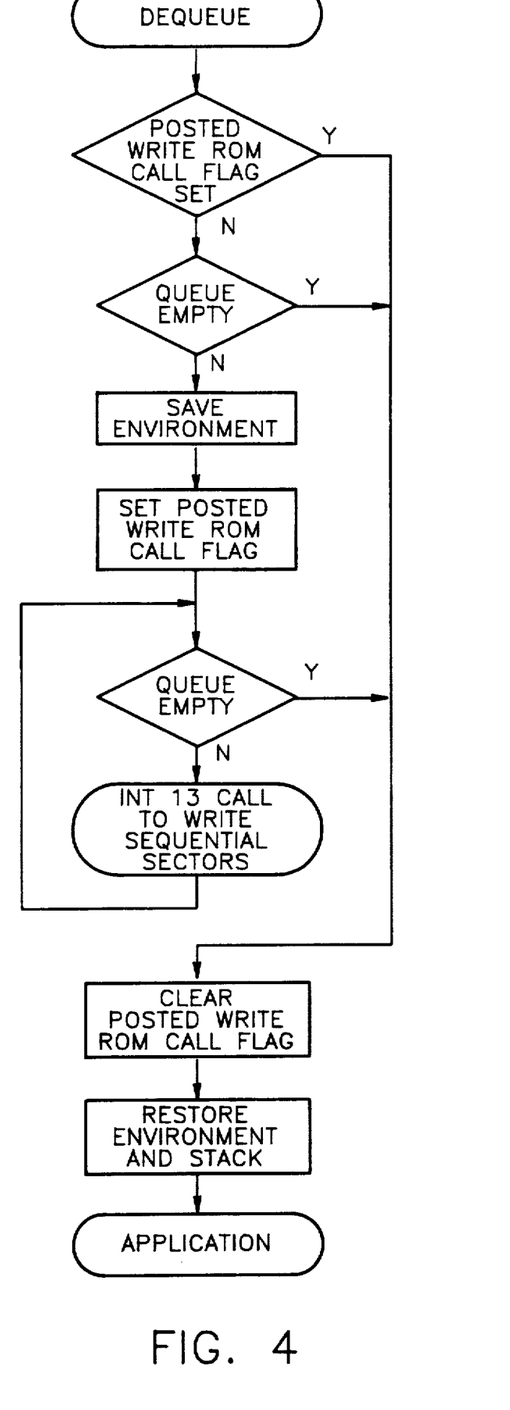

More specifically, the substitute INT 13H routine (FIG. 1) queues the write request and jumps to a DEQUEUE routine (FIG. 4) The DEQUEUE routine in turn generates its own conventional INT 13H write request that specifies the queue as the write buffer.

Figure 2:
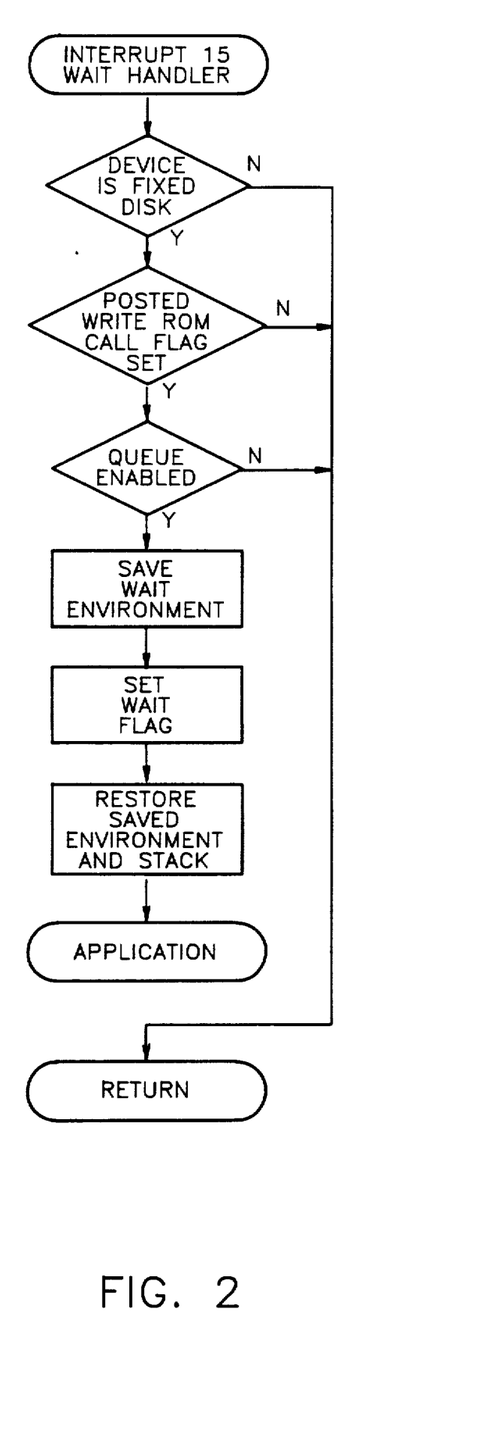

When the conventional INT 13H interrupt handler calls the INT 15H WAIT routine, the substitute INT 15H WAIT routine saves (FIG. 2) the wait environment and returns back to the calling task (instead of to the conventional INT 13H routine that called it), even though the disk controller may not yet have reported completion of the write operation. In effect, this leaves the conventional INT 13H routine in something like a state of suspension.

Figure 3:
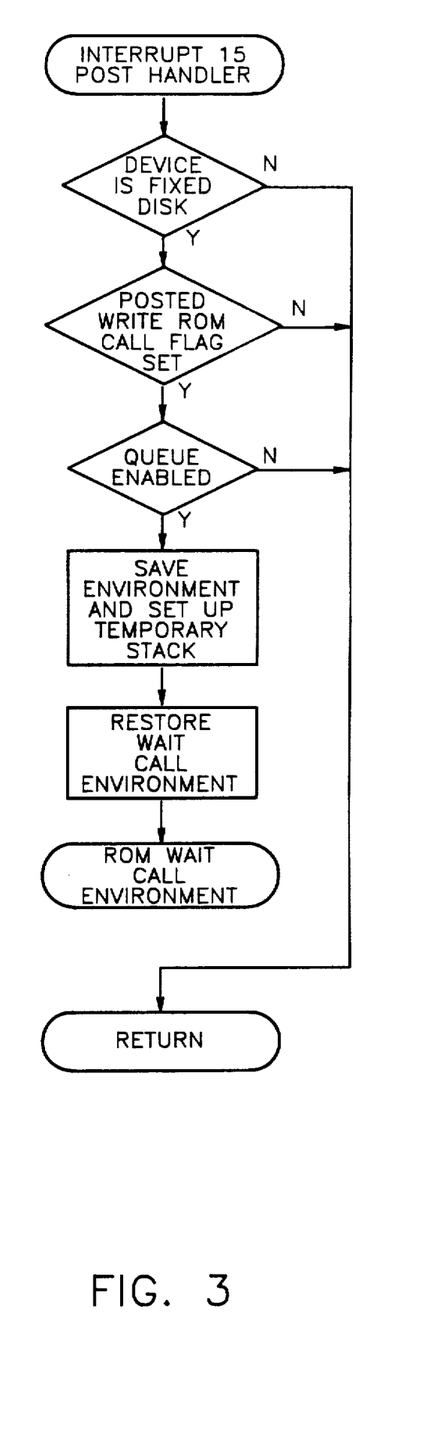

When the disk controller does complete its write operation, it generates a hardware interrupt, thus causing the fixed disk hardware-interrupt-occurred flag to be set and causing the INT 15H POST routine to be called. The substitute INT 15H POST routine (FIG. 3) restores the previously-saved wait environment and returns control to the previously "suspended" conventional INT 13H write routine, in effect reactivating that routine.

Because the fixed disk hardware-interrupt-occurred flag is now set, the now-reactivated conventional INT 13H write routine does not stay in its wait loop waiting for that interrupt (as described above). Instead, the conventional INT 13H write routine finishes its processing and performs an IRET to return control to the DEQUEUE routine that originally called it.

The DEQUEUE routine in turn returns control to the calling task, but at the point where the last hardware interrupt occurred, not at the point where the write request was generated.

ERROR HANDLING

On any time out, queuing is discontinued (i.e., no more write requests are added to the queue) and all write requests already queued are written out individually. Timeout error logic is employed while waiting for the queue to become empty or not full to ensure that a cache controller failure is the only possible cause of an unrecoverable error.

Figure 5:
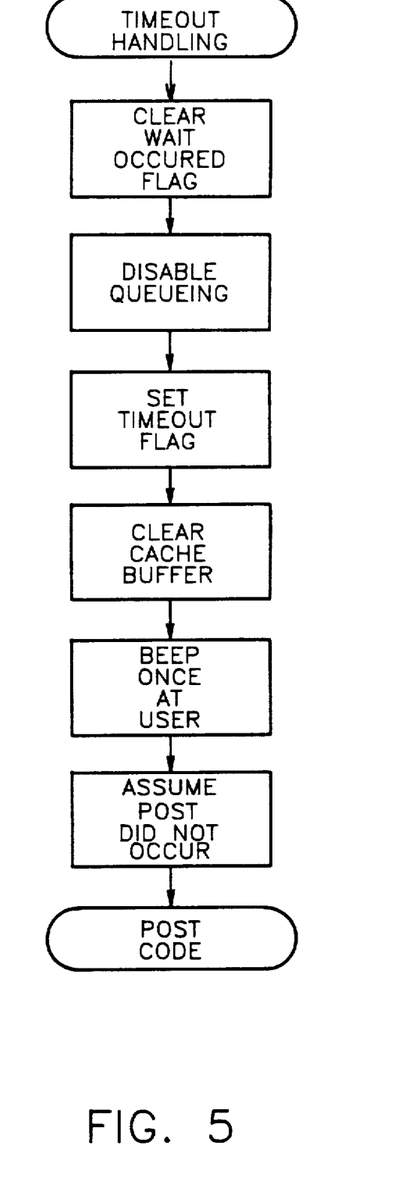
Figure 6:
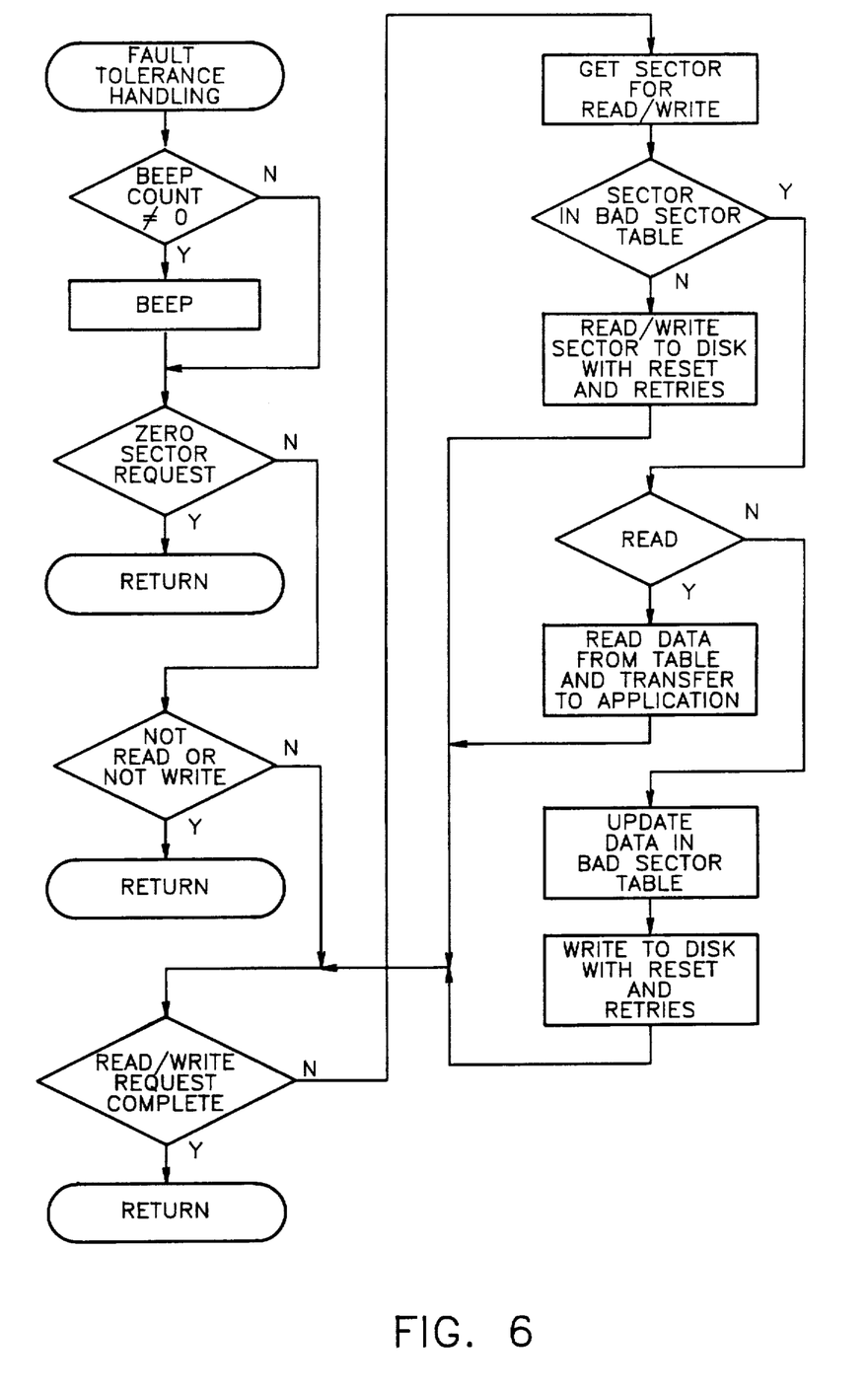

The timeout error logic (FIG. 5) uses flags to determine where the write operation timed out. This aids in making a determination whether or not the last sector sent to the conventional INT 13H write routine was actually written out to the disk. It also aids in determining whether the timeout was caused by hardware (e.g., controller failure) or software (e.g., conflicting programs) and in giving the user an appropriate error message.

Figure 7:
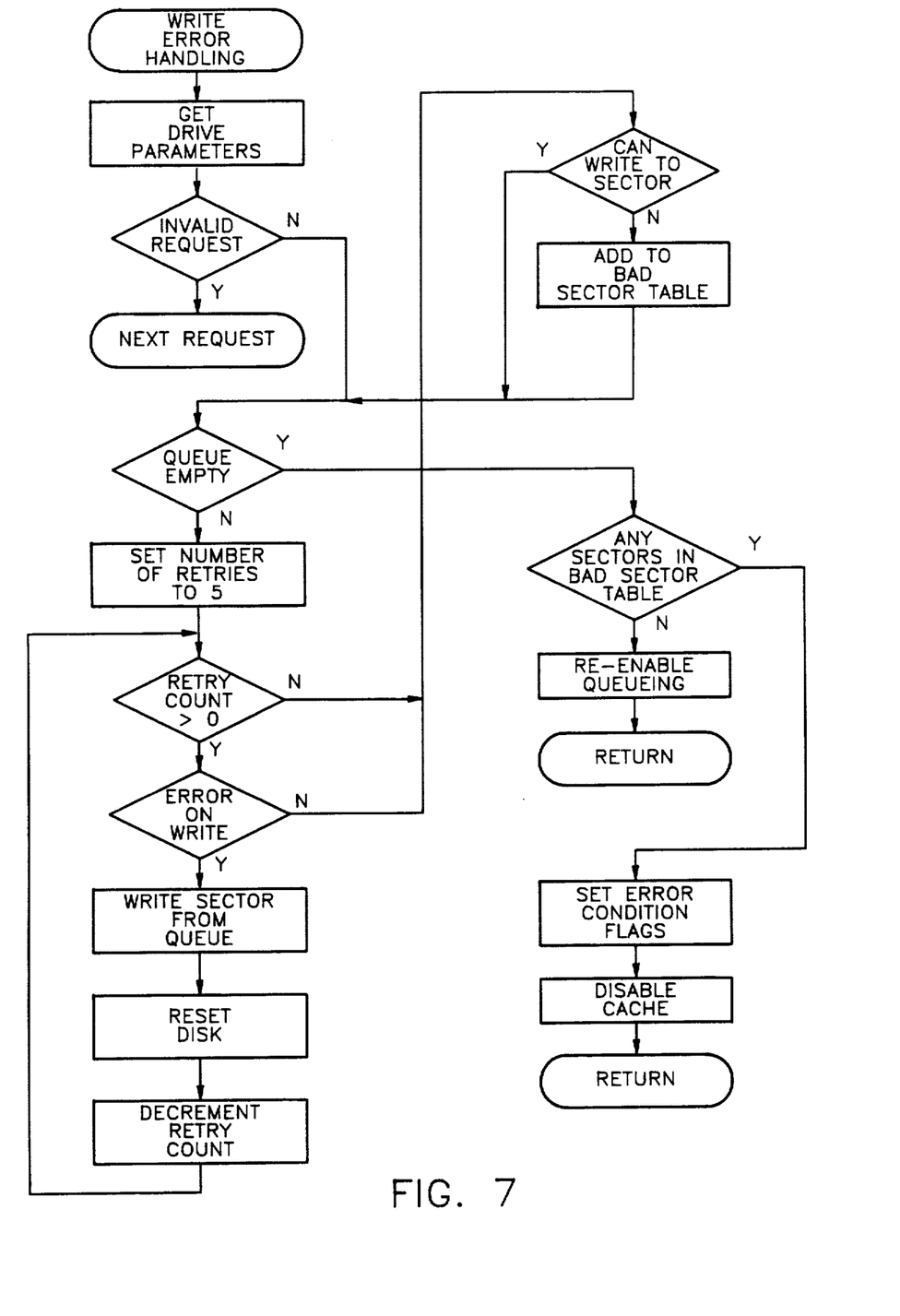

On any sector-not-found write error or address-not-found write error (FIG. 7), repeated attempts (e.g., 5 disk resets and retries) are made to write out each sector in the queue to disk, one at a time. If any given sector(s) cannot be written out, queuing is permanently discontinued (until a reset, of course) and the sector(s) in question are saved in the queue.

Subsequent to such action (until power reset), each disk read request and each disk write request is checked to determine whether any requested sector is in the queue (meaning that the actual disk sector is out of date or perhaps even unaccessible). Such requests are serviced from the queue buffer; if the sector in question is written to, it is updated in the queue buffer. A suitable alarm prompts the user to back up the disk (the backup request will be serviced in part from the queue).

EFFICIENCY CONSIDERATIONS

Queueing of disk writes takes place only for single-sector writes. Only single-sector writes are queued because the queue is small and most writes will be either single-sector or very large multi-sector writes. To accommodate large writes would require too much complexity and overhead; it is regarded as more efficient to handle only the other most common write size, i.e., single-sector writes. (The source code, Appendix 1, includes routines for multi-sector writes.)

If either a multi-sector write request or a disk read request is generated, the queue is forced empty (i.e., i.e., written out to the disk, or "flushed") before the requested operation is performed. If disk reads are cached, the queue is flushed only if the desired sectors to be read are not present in the cache. This queue flushing is a convenient, low-overhead way of ensuring that the data in the queue is always current.

No check is performed for duplication of write requests in the queue. Such a check would theoretically eliminate the extra disk write, but the associated overhead is regarded as not worth the trade-off, because only comparatively rarely will the queue contain two writes to the same disk sector.

Likewise, the queue is not sorted, because the queue is small and since most single-sector writes will either be sequential or will vary greatly across the disk. The overhead associated with moving data (in sorting or in copying to the disk controller buffer) is very high, so in this embodiment the queue is copied once and not moved.

At any given time, the queue may contain write requests for a number of sectors (i.e., if write requests are generated in quick succession by the task). If successive write requests in the queue are directed to successive disk sectors, a more efficient disk write can be accomplished when emptying the queue by performing a multi-sector write from the queue.

Toward this end, the queue in the embodiment described is circular and has a fixed buffer location; furthermore, the head and tail pointers are both placed at the top of the queue when the queue is empty.

Appendixes 3 and 4 (both of which can be found in the application file) outline additional considerations directed to efficient implementation of the posted-write queuing routines.

The foregoing description of the invention has been directed to a particular preferred embodiment for purposes of explanation and illustration. If will be apparent, however, to those skilled in the art having the benefit of this disclosure that many modifications and changes may be made without departing from the essence of the invention. It is the Applicant's intention in the following claims to cover all equivalent modifications and variations as fall within the scope of the invention.

What is claimed is:

1. A method of maintaining a posted-write queue upon a timeout,
    to which queue information sectors addressed to respective corresponding disk sectors may be added, and from which queue said information sectors may be written out to said respective corresponding disk sectors,
    said method comprising the steps of:
    (a) blocking said addition of information sectors to said queue; and
    (b) writing out to said corresponding disk sector each information sector already added to said queue.

2. A method of maintaining a posted-write queue upon a specified type of write error,
    to which queue information sectors addressed to respective corresponding disk sectors may be added, and from which queue said information sectors may be written out to said respective corresponding disk sectors,
    said method comprising the steps of:
    (a) blocking said addition of information sectors to said queue;
    (b) attempting to write out to said corresponding disk sector each information sector already added to said queue; and
    (c) for each said attempt that is unsuccessful, saving said information sector in said queue.

3. A method of maintaining a posted-write queue upon a specified type of write error,
    to which queue information sectors addressed to respective corresponding disk sectors may be added, and from which queue said information sectors may be written out to said respective corresponding disk sectors, said method comprising the steps of:
- (a) blocking said addition of information sectors to said queue;
- (b) attempting to write out to said corresponding disk sector each information sector already added to said queue;
- (c) for each said attempt that is unsuccessful, saving said information sector in said queue; and
- (d) servicing from said queue any subsequent read request or write request directed to a disk sector corresponding to any said saved information sector.

4. A method of managing a posted-write queue to which information sectors addressed to respective corresponding disk sectors may be added, and from which said information sectors may be written out to said respective corresponding disk sectors, said method comprising the steps of:
- (a) upon a timeout, blocking said addition of information sectors to said queue and writing out to said corresponding disk sector each information sector already added to said queue;
- (b) upon a specified type of write error, blocking said addition of information sectors to said queue;
- (c) subsequent to said write error, attempting to write out to said corresponding disk sector each information sector already added to said queue;
- (d) for each said attempt that is unsuccessful, saving said information sector in said queue; and
- (e) servicing from said queue any read request or write request subsequent to said unsuccessful attempt that is directed to a disk sector corresponding to said saved information sector.

* * * * *

UNITED STATES PATENT AND TRADEMARK OFFICE
CERTIFICATE OF CORRECTION

PATENT NO.   : 5,065,354
DATED        : NOV. 12, 1991
INVENTOR(S)  : CURTIS R. JONES AND ROBERT S. GREADY

It is certified that error appears in the above-identified patent and that said Letters Patent is hereby corrected as shown below:

On the title page, Item [75], Inventors, PLEASE REPLACE "JONS" WITH --JONES--.

Signed and Sealed this

Thirtieth Day of March, 1993

Attest:

STEPHEN G. KUNIN

Attesting Officer     Acting Commissioner of Patents and Trademarks